United States Patent [19]

Dunn

[11] 4,114,732
[45] Sep. 19, 1978

[54] DISC BRAKE

[76] Inventor: Robert C. Dunn, 8477 Dorris Rd., Douglasville, Ga. 30134

[21] Appl. No.: 812,529

[22] Filed: Jul. 5, 1977

Related U.S. Application Data

[63] Continuation of Ser. No. 639,453, Dec. 10, 1976, abandoned.

[51] Int. Cl.² .................. F16D 55/10; F16D 65/09
[52] U.S. Cl. .................................................. 188/73.2
[58] Field of Search .............. 188/70 R, 71.1, 71.7, 188/72.1–72.5, 73.1, 73.2, 366, 369, 370; 192/85 R, 111 R

[56] References Cited

U.S. PATENT DOCUMENTS

| | | | |
|---|---|---|---|
| 1,088,248 | 2/1914 | Via | 188/70 R |
| 1,701,237 | 2/1929 | Justice et al. | 188/73.2 |
| 2,181,988 | 12/1939 | Davis | 188/72.4 X |
| 2,794,521 | 6/1957 | Morrison | 188/369 X |
| 3,044,579 | 7/1962 | Klaue | 188/72.4 X |
| 3,268,035 | 8/1966 | Wagner | 188/72.4 X |

*Primary Examiner*—Duane A. Reger
*Attorney, Agent, or Firm*—Jones, Thomas & Askew

[57] ABSTRACT

A disc brake which may be used for vehicles comprising a circular hub having a conical-shaped hub cavity on the back thereof providing a conical face about a central axis and a complementary, corresponding brake disc block mounted on the vehicle wheel axle for longitudinal axial movement thereon into friction engagement with the hub cavity in response to small fluid operated pistons which may be actuated from a vehicle brake control.

4 Claims, 2 Drawing Figures

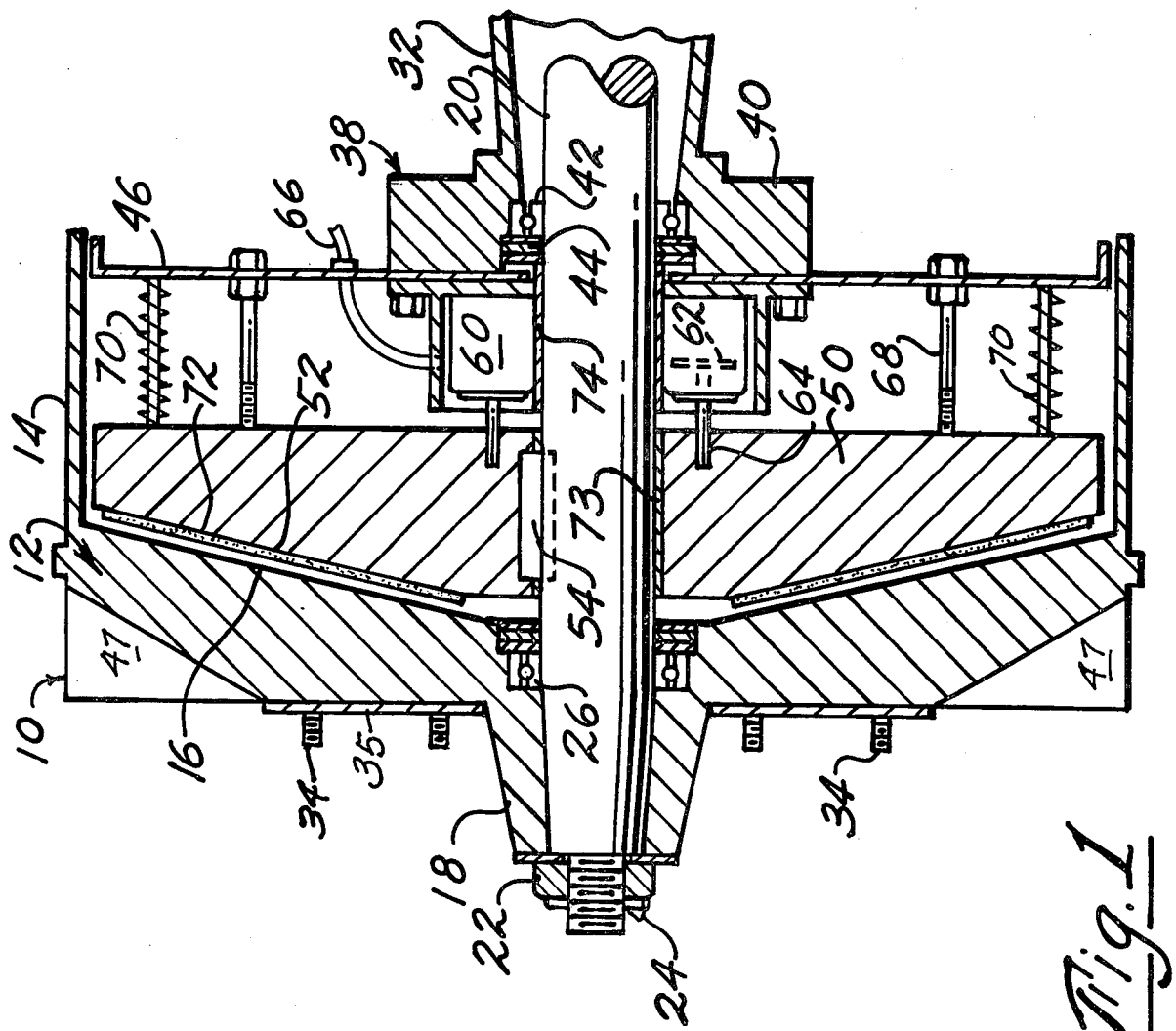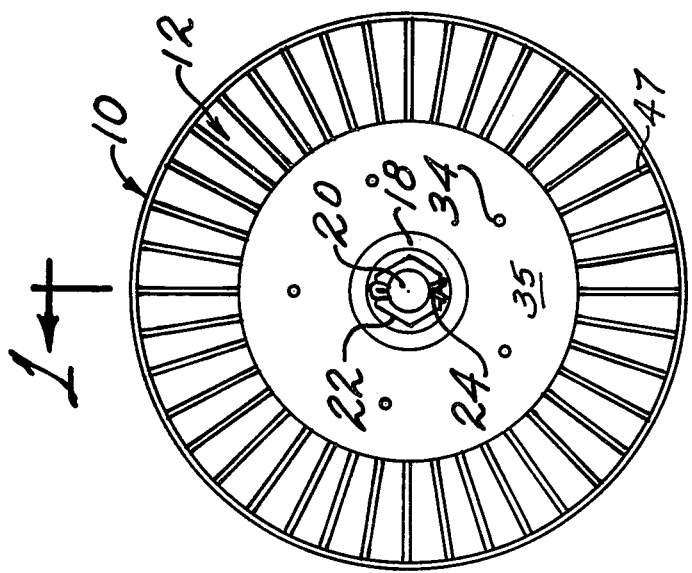

ize the braking effect is substantial.

DISC BRAKE

CROSS REFERENCE TO RELATED APPLICATION

This is a continuation of application Ser. No. 639,453 filed Dec. 10, 1976, now abandoned.

BACKGROUND OF THE INVENTION

1. Field of the Invention

Vehicle brakes and especially axially movable disc brakes employing axially movable disc blocks.

2. Description of the Prior Art

The prior art disc brakes include the caliper type which fit around the plate and during operation are clamped against the plate and the movable shoe arrangements which also includes some shoes movable axially along the longitudinal axis of the wheel spindle rather than the circular brake shoes commonly employed. Such devices are very complex and expensive and must be maintained in satisfactory adjustment. Furthermore, the braking surface which is available from caliper brakes is very small whereas that which is available from the use of small shoes is somewhat limited. The present device provides a large braking surface corresponding substantially to the area of the backside of the inside of the hub so that the braking effect is substantial.

SUMMARY OF THE INVENTION

A disc brake arrangement employing a disc block having a convex face acting against the concave corresponding face of the hub in response to axial movement.

An object of this invention is to provide an effective braking surface in a rather simple braking arrangement.

Another object of this invention is found in the use of a conical shaped interior face on the back inside of the wheel hub against which bears the braking surface of a large conical shaped disc block.

Another object of this invention is found in the simplicity of construction and operation.

Other and further objects and advantages of this invention will become apparent upon reading the following specification taken in conjunction with the accompanying drawings, in which:

FIG. 1 is a cross-sectional view of a wheel having the present brake arrangement installed thereon and taken substantially along lines 1—1 in FIG. 2.

FIG. 2 is a front elevation view of the wheel shown in FIG. 1.

DESCRIPTION OF A PREFERRED EMBODIMENT

The wheel assembly designated generally by reference numeral 10 in FIG. 2 comprises a wheel 12 having a generally cylindrical hub 14 with a solid hub body or block 16 of circular construction including a tapered, cone-shaped nose 18 having a central bore receiving the normally horizontal wheel shaft or spindle 20 thereon which is locked in place by means of a nut and washer 22 having a cotter pin 24 therein and provided with the usual washer and seal and bearing arrangement. There is also an internal bearing 26 provided with a seal about the wheel shaft 20. The axle or spindle shaft 20 is mounted within a housing 32. Lug studs 34 are provided peripherally around the outer face of the circular hub body 16 on plate 35 to receive the wheel (not shown) thereon. The end of housing 32 is provided with an optional circular bearing assembly designated generally by reference numeral 38 and comprising a circular plate 40 in which optionally is mounted a bearing 42 and a bearing seal 44 to which is attached a circular back plate 46. Cooling fins 47 are provided at spaced intervals on hub body 16.

The inside, back face of the hub body 16 of the hub 14 is concave and conical in formation, as seen in the cross-sectional view in FIG. 1.

A conical shaped disc block 50 has the convex conical face 52 corresponding with the back of the face of the wheel hub and optionally is attached and keyed to the shaft 20 by means of an optional key 54 for straight line axial movement against the normally rotating braking face of the wheel hub 14. A single circular hydraulic cylinder 60 attached to the face of the back plate 46 and to the bearing assembly 38 has two small pistons 62 therein which operate small piston rods 64 that are attached to the backside of the disc block 50. A small hydraulic fluid line 66 leads from a hydraulic brake pressure device (not shown) such as a foot, operated master cylinder or conventional brake pressure arrangement. A pair of spaced adjustment bolts 68 are attached to the back plate 46 and extend into the back of the disc block 50 for adjusting same inwardly or outwardly relative to the inside face of the hub. Two pairs of small, radially spaced coil springs 70 are attached between the back plate 46 and the disc block 50 and are stretched or expanded whenever the hydraulic pressure causes the small piston rod 64 to move a friction brake material 72 attached to the face 52 of the disc block 50 into engagement with the inside (or backside) face of the hub body 16. Disc block 50 may be provided with a metal bushing 73 and there also may be another metal bushing 74 between the axle shaft 20 and the wheel cylinder 60.

OPERATION

In the operation of the device, the face of the disc block 50 would be provided with the friction brake material similar to bonded linings of a conventional compound used in the brake lining art for the purpose of engaging the conical back surface of the hub body 16 during the movement thereof. Pressure in the fluid line 66 causes the small piston rods 64 to push the brake material 72 into engagement with the smooth back surface of the inside face of the hub body 16 thereby braking same all across the corresponding surface. Adjustment for wear, alignment and so forth is performed by moving the set screws or bolts 68 inwardly or outwardly as the case may be.

The invention is especially useful for vehicle brakes but may be used on a machine or other places to perform braking functions.

Therefore, while I have shown and described a particular embodiment of this invention this is by way of illustration only and does not constitute any sort of limitation on the scope of this invention since various alterations, changes, eliminations, deviations, and variations may be made without departing from the scope of this invention as defined in the appended claims.

What is claimed:

1. In a brake assembly for a vehicle or the like comprising a nonrotatable shaft and a hub defining a central opening therein and internal bearing means in said opening, said hub being rotatably mounted on said shaft with said bearing means engaging said shaft, said hub including a plurality of lug studs extending in a circular arrangement about said opening from the outer face thereof for mounting a wheel thereon, and a concave conical surface formed in said hub on the back face thereof opposite to said lug studs, said concave conical surface having its central axis aligned with the axis of said shaft and extending from immediately adjacent said bearing means and said opening from a radius substantially smaller than the radius of the circular arrangement of said lug studs radially outwardly to the peripheral portion of said hub to a radius substantially greater than the radius of the circular arrangement of said lug studs, a disc block defining an opening therein, said shaft extending through the opening of said disc block with said disc block movable along the length of said shaft, a key and slot assembly connecting together said disc block and said shaft so that said disc block is movable along the length of said shaft and is nonrotatably held on said shaft, said disc block including a convex conical surface having its central axis aligned with the axis of said shaft and being of a size and shape corresponding to the size and shape of the concave conical surface of said hub so that the convex conical surface of said disc block is movable with said disc block along said shaft toward and away from the concave conical surface of said hub into engagement with substantially the entire concave conical surface of said hub, an annular hydraulic cylinder extending about said shaft and including means extending therefrom at positions closely adjacent said shaft and inwardly of the convex conical surface of said disc block for urging said disc block toward engagement with said hub, and spring means positioned adjacent the peripheral portions of said disc block and said hub for urging said disc block away from said hub.

2. In a brake assembly for a vehicle or the like comprising a nonrotatable spindle shaft and a hub rotatably mounted on said shaft, said hub including a hub body defining an opening therethrough with said spindle shaft extending through said opening, a plurality of lug studs extending outwardly from the outer face of said hub body in a circular arrangement about said opening, a concave conical face formed in said hub body opposite to said outer face with its central axis aligned with the axis of said spindle shaft and extending from the opening in said hub from a radius less than the radius of said circular arrangement of lug studs outwardly to the peripheral portion of said hub to a radius greater than the radius of said lug studs, and a cylindrical flange extending inwardly from the periphery of said conical concave face, a disc block defining an opening therethrough with said spindle shaft extending through said opening, means for restricting rotational movement of said disc block about said spindle shaft and permitting movement of said disc block along the length of said spindle shaft within the confines of the cylinderical flange of said hub, a convex conical surface on said disc block of a size and shape corresponding to the size and shape of the concave conical surface of said hub body and movable with said disc block toward and away from engagement with substantially the entire surface of the concave conical surface of said hub body, a back plate nonrotatably mounted on said spindle shaft and substantially enclosing said disc block within the cylindrical flange of said hub, and hydraulic means positioned within the enclosure of said cylindrical flange and back plate for urging the convex conical surface of said disc block toward engagement with the concave conical surface of said hub body.

3. The device in claim 1 wherein said hub comprises a cylindrical hub portion extending about said disc block and a back plate enclosing said disc block inside said cylindrical portion.

4. The device in claim 1 and further including a back plate mounted on said shaft, adjustable screw members mounted on said back plate for engagement with said disc block, and spring means mounted between said back plate and said disc block for assisting in the return of said disc block away from the concave conical surface of said hub and to resist the movement thereof toward the concave conical surface of said hub.

* * * * *